United States Patent
Lai et al.

(10) Patent No.: US 8,141,611 B2
(45) Date of Patent: Mar. 27, 2012

(54) SEPARATION APPARATUS AND SEPARATION METHOD

(75) Inventors: Yao-Hsiang Lai, Taoyuan County (TW); Ta-Cheng Liu, Taoyuan County (TW); Jung-Hung Hung, Taoyuan County (TW); Yu-Meng Lin, Taoyuan County (TW); Kuo-Lung Yang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 259 days.

(21) Appl. No.: 12/420,825

(22) Filed: Apr. 9, 2009

(65) Prior Publication Data
US 2010/0107834 A1    May 6, 2010

(30) Foreign Application Priority Data
Nov. 4, 2008 (TW) .............................. 97142574 A

(51) Int. Cl.
*B32B 38/10* (2006.01)
(52) U.S. Cl. ........ 156/762; 156/701; 156/761; 156/924; 83/307.1; 83/307.2; 83/454; 83/455; 83/548; 83/635; 83/651.1; 83/662; 83/828
(58) Field of Classification Search .................. 156/701, 156/761, 762, 924; 83/15, 307.1, 307.2, 83/375, 425, 454, 455, 548, 635, 651.1, 662, 83/697, 699.11, 699.21, 813, 820, 821, 827, 83/828
See application file for complete search history.

(56) References Cited

U.S. PATENT DOCUMENTS
4,393,450 A * 7/1983 Jerard ........................... 700/163
4,606,254 A   8/1986 Schmalz

FOREIGN PATENT DOCUMENTS
TW    I264356    10/2006

OTHER PUBLICATIONS
"Office Action of Taiwan Counterpart Application", issued on Nov. 14, 2011, p. 1-p. 5, in which the listed reference was cited.

* cited by examiner

*Primary Examiner* — Mark A Osele
*Assistant Examiner* — Nickolas Harm
(74) *Attorney, Agent, or Firm* — Jianq Chyun IP Office

(57) ABSTRACT

A separation apparatus for separating two planar devices bonded together by an adhesive layer is provided. The separation apparatus includes a base, a sliding module, a cutting member, and a positioning stage. The sliding module is mounted on the base. The cutting member is connected to the sliding module and is moveable in a two-dimensional plane with respect to the base by the sliding module for cutting the adhesive layer. The positioning stage is mounted on the base for positioning the planar devices and the adhesive layer therebetween on the base.

10 Claims, 2 Drawing Sheets

SEPARATION APPARATUS AND SEPARATION METHOD

CROSS-REFERENCE TO RELATED APPLICATION

This application claims the priority benefit of Taiwan application serial no. 97142574, filed on Nov. 4, 2008. The entirety of the above-mentioned patent application is hereby incorporated by reference herein and made a part of specification.

BACKGROUND OF THE INVENTION

1. Field of the Invention

The present application generally relates to a separation apparatus and a separation method, and more particularly, to a separation apparatus and a separation method for separating two planar devices that are bonded together by an adhesive layer.

2. Description of Related Art

Portable electronic devices usually are equipped with a display module to display images to users. The display module of some portable electronic devices is further provided with a touch panel in replace of a physical keyboard such that the portable electronic device can still provide a larger image size in its limited primary vision area.

The display module and touch panel of the portable electronic device conventionally are assembled to a housing of the portable electronic device separately, which may lead to a gap between the display module and the touch panel. However, such a gap is disadvantageous in reducing an overall thickness of the portable electronic device.

Currently, there is a thinning technology in which the display module and the touch panel are bonded together by a transparent adhesive layer to hopefully achieve a reduced thickness. However, when the touch panel needs to be replaced due to a failure or scratch, replacing the touch panel causes a replacement of the display module accordingly because the display module has been already bonded to the touch panel, thus increasing rework and repair cost.

SUMMARY OF THE INVENTION

Accordingly, the present application is directed to a separation apparatus for separating two planar devices that are bonded together by an adhesive layer.

The present application is also directed to a separation method for separating two planar devices that are bonded together by an adhesive layer.

The present application provides a separation apparatus for separating two planar devices that are bonded by an adhesive layer. The separation apparatus includes a base, a sliding module, a cutting member, and a positioning stage. The sliding module is mounted on the base. The cutting member is connected to the sliding module and moveable in a two-dimensional plane with respect to the base by the sliding module for cutting the adhesive layer. The positioning stage is mounted on the base and positioning the planar devices and the adhesive layer therebetween on the base.

The present invention provides a separation method for separating two planar devices that are bonded by an adhesive layer. The separation method comprises positioning the planar devices and the adhesive layer therebetween and subsequently cutting the adhesive layer using a cutting member.

In summary, the present application employs a cutting member to separate two planar devices that are bonded by an adhesive layer. Therefore, when one of the planar devices needs to be replaced, the present application can be used to separate the planar devices to keep the other one of the planar devices, thus reducing the rework or repair cost.

In order to make the aforementioned and other features and advantages of the present invention more comprehensible, embodiments accompanied with figures are described in detail below.

DESCRIPTION OF THE EMBODIMENTS

Figure 1:
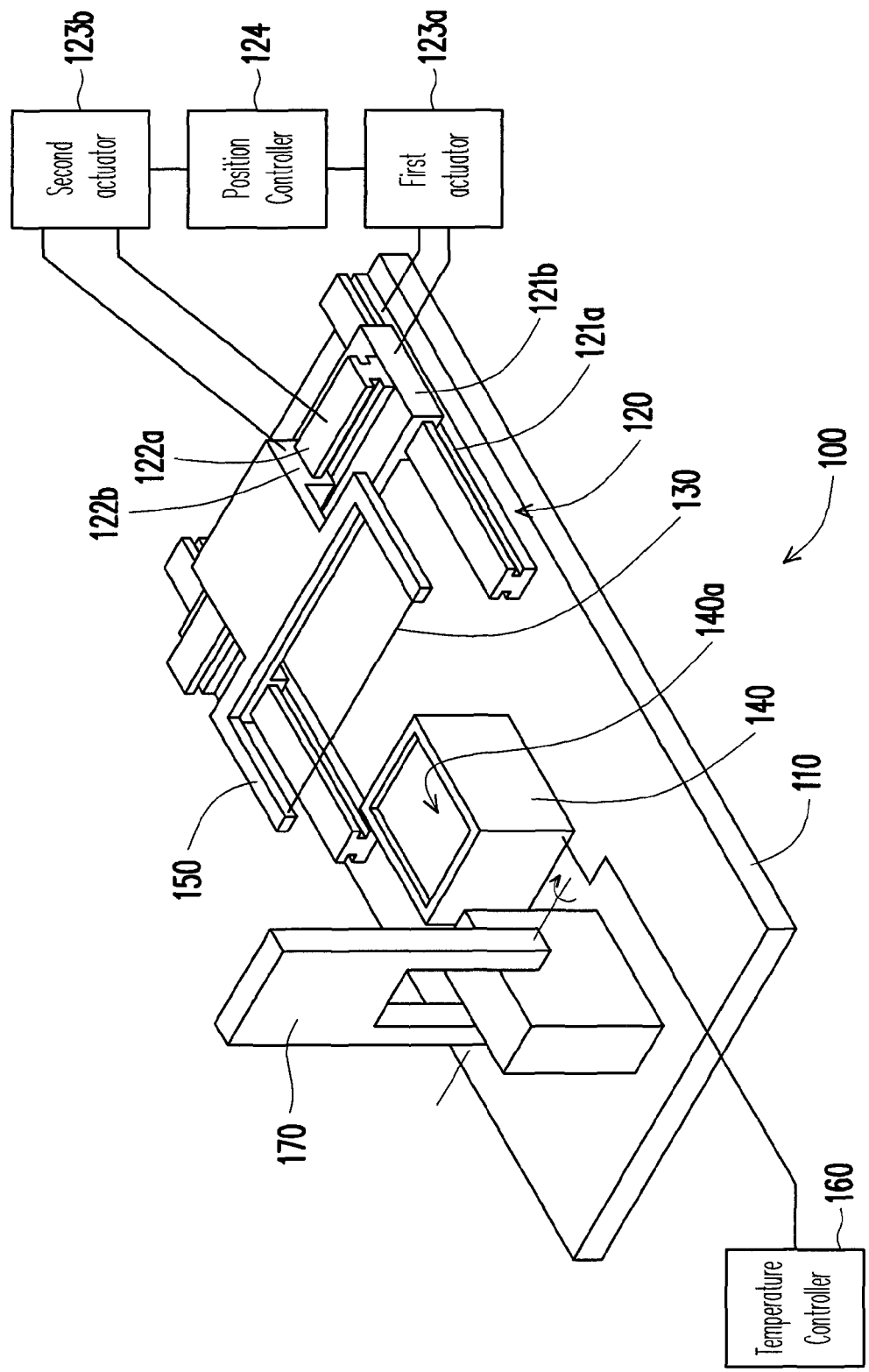
FIG. 1 is a perspective view of a separation apparatus according to one embodiment of the present invention.
Figure 2:
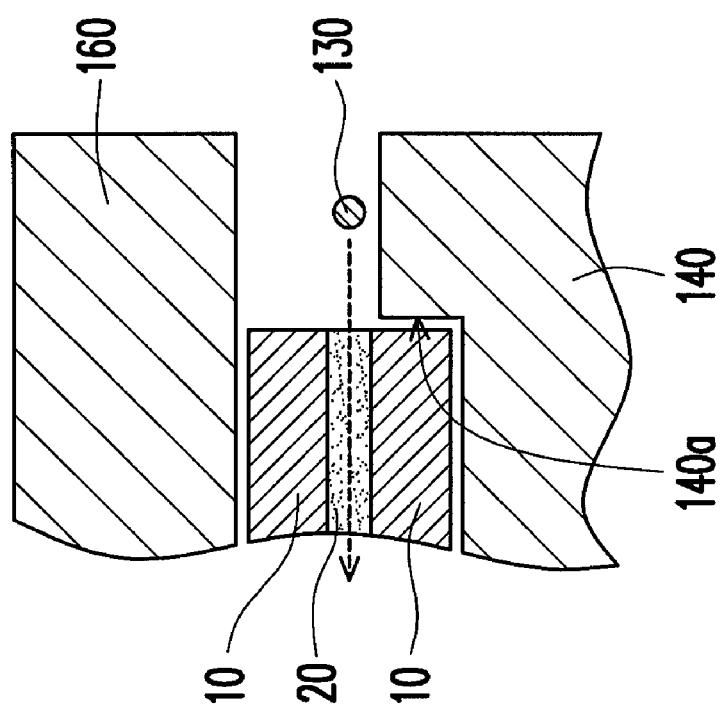
FIG. 2 is a cross-sectional view of the separation apparatus of FIG. 1 wherein the separation apparatus is being used to separate two planar devices bonded by an adhesive layer.

FIG. 1 is a perspective view of a separation apparatus according to one embodiment of the present invention, and FIG. 2 is a cross-sectional view of the separation apparatus of FIG. 1 wherein the separation apparatus is being used to separate two planar devices bonded by an adhesive layer. Referring to FIG. 1 and FIG. 2, the separation apparatus 100 of the present embodiment is suitable for separating two planar devices 10 that are bonded by an adhesive layer 200. In the present embodiment, the planar devices 10 are a display module and a touch panel, respectively. The display module may be a liquid crystal display module. The touch panel may be a resistive touch panel, a capacitive touch panel, an infrared touch panel, or other types of touch panels. However, in an alternative embodiment not illustrated, these planar devices 10 may be a display module and a protective sheet made of a plastic or glass material. In a further alternative embodiment not illustrated, these planar devices 10 may be a touch panel and a protective sheet made of a plastic or glass material. Besides, the adhesive layer 20 may be made of light curing resin, heat curing resin or other types of resin.

The separation apparatus 100 includes a base 110, a sliding module 120, a cutting member 130, and a positioning stage 140. The sliding module 120 is mounted on the base 110. The cutting member 130 is connected to the sliding module 120 and can be moved by the sliding module 120 in a two-dimensional plane with respect to the base 110. The positioning stage 140 is mounted on the base 110 for positioning the planar devices 10 and the adhesive layer 20 therebetween on the base 110. Therefore, movement of the cutting member 130 can cause the adhesive layer 20 between the planar devices 10 to be cut, thus separating the planar devices 10 from each other.

In the present embodiment, the sliding module 120 further includes a pair of first rails 121a fixedly mounted to the base 110, and a pair of first sliding blocks 12 slidably coupled with the first rails 121a respectively. Besides, the sliding module 120 further includes a second rail 122a fixedly mounted to the pair of first sliding blocks 121b, and a second sliding block 122b slidably coupled with the second rail 122a. As such, the sliding module 120 can be driven by an external force to move the cutting member 130 with respect to the base 110. While the second rail 122a and the first rails 121a are arranged to be perpendicular to each other so as to move the cutting member 130 in X and Y axes in the present embodiment, the sliding module 120 could only include the first rails 121a to enable displacement of the cutting member 130 in a single axis in alternative embodiments.

In the present embodiment, the sliding module 120 further includes a first actuator 123a and a second actuator 123b. The first actuator 123a is connected between the first rail 121a and first sliding block 121b for driving the first sliding block 121b to slide. The second actuator 123b is connected between the second rail 122a and the second sliding block 122b for driving the second sliding block 122b to slide. As such, the sliding module 120 can automatically move the cutting member 130 at the same level by means of the first actuator 123a and the second actuator 123b. In addition, the sliding module 120 further includes a position controller 124 coupled to the first actuator 123a and the second actuator 123b. As such, the sliding module 120 can control the position of the cutting member 130 in the XY plane with respect to the base 110 by means of the position controller 124.

In the present embodiment, the cutting member 130 is a wire with a wire diameter smaller than a thickness of the adhesive layer 20 to be cut as shown in FIG. 2. In alternative embodiments, the cutting member 130 may also be a wire saw, a saw blade, or a wire with a coarse surface. Besides, in the present embodiment, the separation apparatus 100 further includes a support member 150 connecting the cutting member 130 to the sliding module 120. The support member 150 is a U-shaped bracket with two bracket ends connected to two ends of the cutting member 130 to retain the cutting member 130 in a straight line configuration. As such, when driven by the sliding module 120 and drawn by the support member 150, the cutting member 130 can cut the adhesive layer 20 between the planar devices 10.

Depending upon the material of the adhesive layer 20, softening the adhesive layer 20 may be achieved by heating, special light curing or dipping it in a special solution. However, it should be noted that it is also possible that the adhesive layer 20 does not undergo any softening process. In the present embodiment, the adhesive layer 20 is softened by heating. In order to soften the adhesive layer 20, the positioning stage 140 may further be provided with a heating capability, i.e., a heater (not shown) is disposed inside the positioning stage 140. As such, the positioning stage 140 may indirectly heat the adhesive layer 20 by directly heating one of the planar devices 10.

Besides, in the present embodiment, the separation apparatus 100 may further include a temperature controller 160 coupled to the positioning stage 140 for controlling the temperature of the positioning stage 140. The temperature of the positioning stage 140 is controlled approximately between approximately 60 Celsius degrees and approximately 70 Celsius degrees and, preferably, approximately 65 Celsius degrees. In addition, to achieve more uniformity of the temperature across the adhesive layer 20, the structure to be separated can be pre-heated in a heating oven with a temperature between approximately 60 Celsius degrees and approximately 70 Celsius degrees and, preferably, approximately 65 Celsius degrees. In the present embodiment, to position the planar devices 10 on the positioning state 140, the positioning stage 140 is provided with a receiving cavity 140 for receiving one of the planar devices 10.

Likewise, to position the structure to be separated on the positioning stage 140, the separation apparatus 100 may further include a positioning head 170. The positioning head 170 is movably connected to the base 110 and can cooperate with the positioning stage 140 to position the planar devices 10 and the adhesive layer 20 between the planar devices 10 with respect to the base 110. In the present embodiment, the positioning head 170 is pivotably mounted to the base 110 and can be pivoted into abutment with an upper one of the planar devices 10, as shown in FIG. 2. In alternative embodiments, the positioning head 170 may also be mounted on a sliding rod such that the positioning head 170 can vertically move toward the positioning stage 140 to position these planar devices 10. Separation of these planar devices 10 will now be described below.

Figure 3:
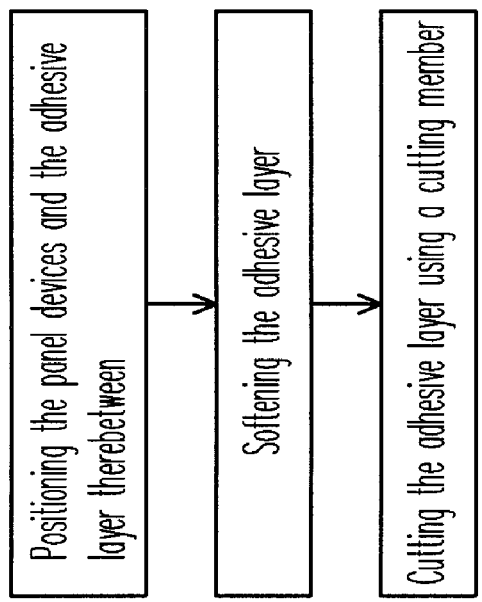
FIG. 3 is a flow chart of a separation method according to another embodiment of the present invention.

FIG. 3 is a flow chart of a separation method according to another embodiment of the present invention. Referring to FIG. 3, the separation method is suitable for separating two planar devices bonded by an adhesive layer. The separation method of the present embodiment includes positioning the planar devices and the adhesive layer therebetween and subsequently cutting the adhesive layer using a cutting member.

In the separation method of the present embodiment, some elements described in the embodiment illustrated in FIG. 1 and FIG. 2 are used, which will be described below.

Referring to FIGS. 1, 2 and 3, positioning the planar devices 10 and the adhesive layer 20 therebetween includes disposing one of the planar devices 10 in the receiving cavity 140a of the positioning stage 140 and subsequently restricting the other of the planar devices 10 from moving relative to the positioning stage 140 by means of the positioning head 170 cooperating with the positioning stage 140. The separation method of the present embodiment further includes heating the adhesive layer 20 by the positioning stage 140 before cutting the adhesive layer 20.

In the present embodiment, cutting the adhesive layer 20 using the cutting member 130 includes moving the cutting member 130 between the planar devices 10 with respect to the planar devices 10 to cut the adhesive layer 20 to separate the planar devices 10. The cutting member 130 may be a wire, a wire saw, a saw blade, or a wire with a coarse surface. For example, in the case that these planar devices 10 are a display module and a touch panel, when the touch panel needs to be replaced due to a failure or scratch, the touch panel may be removed by the separation method and separation apparatus described above. Therefore, the remaining display module in good condition can be re-bonded with a touch panel that works normally, thus reducing the repair cost.

In summary, the present application employs a cutting member to separate two planar devices that are bonded by an adhesive layer. Therefore, when one of the planar devices needs to be replaced, the present application can be used to separate the planar devices to keep the other one of the planar devices, thus reducing the rework or repair cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A separation apparatus for separating two planar devices that are bonded by an adhesive layer, the separation apparatus comprising:
   a base;
   a sliding module mounted on the base;
   a cutting member connected to the sliding module and moveable in a two-dimensional plane with respect to the base by the sliding module for cutting the adhesive layer; and
   a positioning stage mounted on the base and capable of positioning the planar devices and the adhesive layer between the planar devices on the base, wherein the positioning stage is provided with a heating capability and a temperature controller is coupled to the positioning stage.

2. The separation apparatus according to claim 1, wherein the sliding module comprises:
   a first rail mounted on the base;
   a first sliding block slidably coupled with the first rail;
   a second rail mounted on the first sliding block; and
   a second sliding block slidably coupled with the second rail.

3. The separation apparatus according to claim 2, wherein the sliding module further comprises:
   a first actuator connected between the first rail and the first sliding block for driving the first sliding block to slide; and
   a second actuator connected between the second rail and the second sliding block for driving the second sliding block to slide.

4. The separation apparatus according to claim 3, wherein the sliding module further comprises a position controller coupled to the first actuator and the second actuator.

5. The separation apparatus according to claim 1, wherein the cutting member comprises a wire, a wire saw, a saw blade, or a wire with a coarse surface.

6. The separation apparatus according to claim 1, further comprising a support member connecting the cutting member to the sliding module.

7. The separation apparatus according to claim 6, wherein the support member is a U-shaped bracket with two bracket ends connected two ends of the cutting member, respectively, to retain the cutting member.

8. The separation apparatus according to claim 1, wherein the positioning stage has a receiving cavity for receiving one of the planar devices.

9. The separation apparatus according to claim 1, further comprising a positioning head movably connected to the base and adapted to cooperate with the positioning stage to position the planar devices and the adhesive layer between the planar devices on the base.

10. A separation apparatus for separating two planar devices that are bonded by an adhesive layer, the separation apparatus comprising:
   a base;
   a sliding module mounted on the base;
   a cutting member connected to the sliding module and moveable in a two-dimensional plane with respect to the base by the sliding module for cutting the adhesive layer; and
   a positioning stage mounted on the base and capable of positioning the planar devices and the adhesive layer between the planar devices on the base,
   wherein the sliding module comprises:
      a first rail mounted on the base;
      a first sliding block slidably coupled with the first rail;
      a second rail mounted on the first sliding block;
      a second sliding block slidably coupled with the second rail;
      a first actuator connected between the first rail and the first sliding block for driving the first sliding block to slide; and
      a second actuator connected between the second rail and the second sliding block for driving the second sliding block to slide.

* * * * *